(12) United States Patent
Niestroj

(10) Patent No.: US 10,602,595 B1
(45) Date of Patent: Mar. 24, 2020

(54) MODULATING AN ILLUMINATION LEVEL OF A USER INTERFACE LUMINOUS ELEMENT

(71) Applicant: The Gillette Company LLC, Boston, MA (US)

(72) Inventor: Benjamin Heinrich Niestroj, Konigstein im Taunus (DE)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 16/561,527

(22) Filed: Sep. 5, 2019

Related U.S. Application Data

(60) Provisional application No. 62/727,329, filed on Sep. 5, 2018.

(51) Int. Cl.
 *H05B 45/10* (2020.01)
 *B26B 21/48* (2006.01)
 *B26B 21/40* (2006.01)

(52) U.S. Cl.
 CPC .......... *H05B 45/10* (2020.01); *B26B 21/4056* (2013.01); *B26B 21/48* (2013.01)

(58) Field of Classification Search
 CPC ........ H05B 37/02; H05B 33/08; H05B 45/00; H05B 45/10; H05B 45/20; H05B 45/30; H05B 45/305; H05B 45/31; H05B 45/32; H05B 45/325; H05B 47/105; H05B 47/16; H05B 47/165; H05B 47/00; H05B 47/10; B26B 21/4056; B26B 21/48
 See application file for complete search history.

(56) References Cited

U.S. PATENT DOCUMENTS

| 7,592,981 B2 * | 9/2009 | Maeda ................. G09G 3/3233 345/75.2 |
| 8,198,830 B2 | 6/2012 | Lin |
| 8,217,588 B2 | 7/2012 | Mckinney |

(Continued)

FOREIGN PATENT DOCUMENTS

| EP | 2584866 B1 | 7/2015 |
| JP | 2009023594 A | 2/2009 |

(Continued)

OTHER PUBLICATIONS

D. Polin PhD, et al., Reducing the Stroboscopic Effects of LED Luminaires with Pulse Width Modulation Control, Lighting Res. Technol. 2017. vol. 49: 370-380.

(Continued)

*Primary Examiner* — Jimmy T Vu
(74) *Attorney, Agent, or Firm* — John M. Lipchitz

(57) ABSTRACT

An illumination level of a luminous element of a user interface for an electrical device is controlled by a processor driving the luminous element with a pulse-width-modulated (PWM) or other type of control signal that is calculated based on a) a signal corresponding to a desired time-varying illumination level of the luminous element to be perceived by a human observer and b) a nonlinear sensitivity relationship between an actual illumination level and a resulting illumination level perceived by a human eye, wherein the corresponding signal comprises an increasing sinusoidal-based ramp function and a decreasing sinusoidal-based ramp function.

20 Claims, 12 Drawing Sheets

(56) References Cited

U.S. PATENT DOCUMENTS

| | | |
|---|---|---|
| 8,223,131 B2 | 7/2012 | Rudolph |
| 8,242,711 B2 | 8/2012 | Summerland |
| 8,319,445 B2 | 11/2012 | Mckinney |
| 8,508,147 B2 | 8/2013 | Shen |
| 9,253,835 B2 | 2/2016 | Bakk |
| 9,313,850 B2 | 4/2016 | Zhao |
| 9,775,201 B2 | 9/2017 | Koolen |
| 9,967,944 B2 | 5/2018 | Fang |
| 2013/0249437 A1 | 9/2013 | Wang |
| 2015/0289334 A1 | 10/2015 | Campbell |
| 2016/0036349 A1 | 2/2016 | Steiner |
| 2017/0164441 A1 | 6/2017 | Nieuwlands |

FOREIGN PATENT DOCUMENTS

| | | |
|---|---|---|
| JP | 2011009011 A | 1/2011 |
| WO | WO03105540 A2 | 12/2003 |

OTHER PUBLICATIONS

Dustin Rand et al, Issues, Models and Solutions for Triac Modulated Phase Dimming of LED Lamps, Issues, Models and Solutions for Triac Modulated Phase Dimming of LED Lamps, Dustin Rand et al., Issues, Models and Solutions for Triac Modulated Phase Dimming of LED Lamps, 7 pages.

Introduction to Dimming Concepts, iLumin System Commissioning Training, 10 pages.

\* cited by examiner

FIG. 2A        PWM Duty Cycle
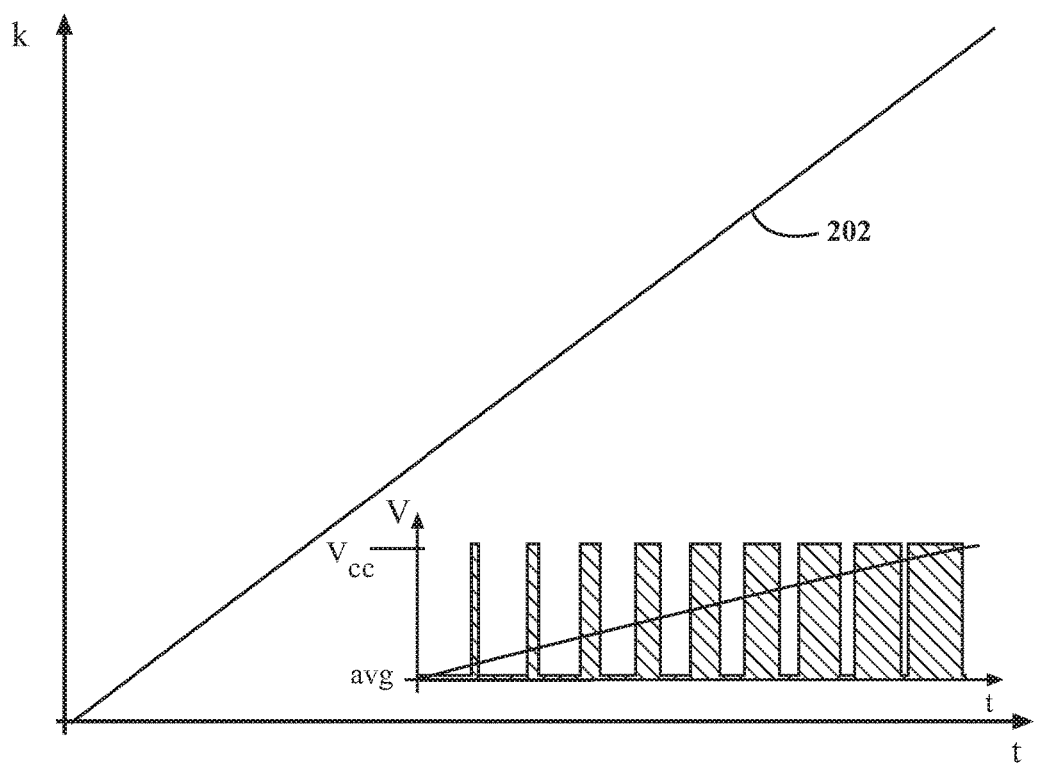
FIG. 2B     Subjective Brightness
              Perception of Human Eye
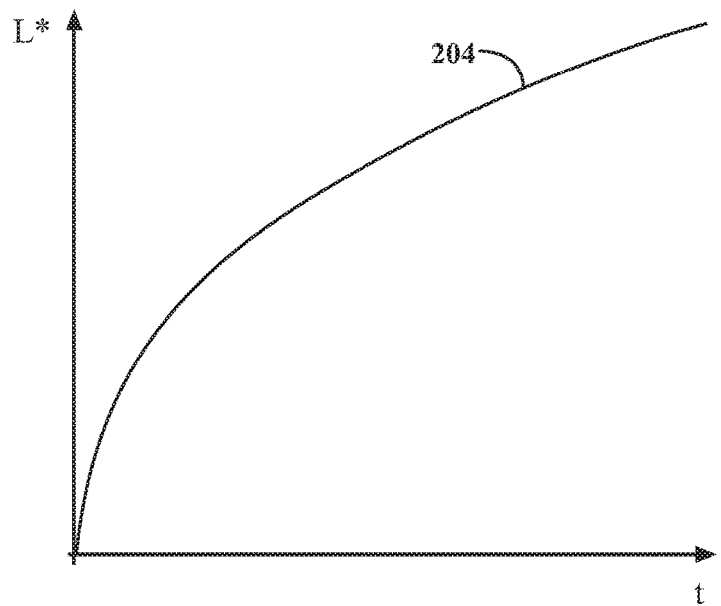

FIG. 4A PWM Duty Cycle
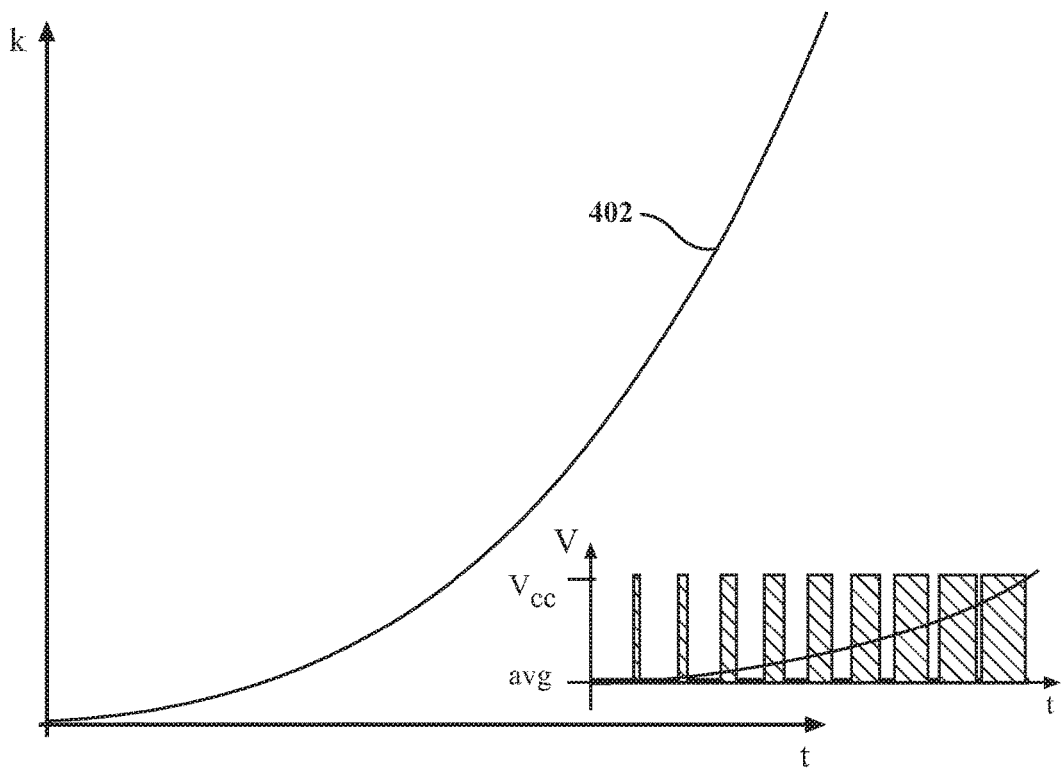
FIG. 4B Subjective Brightness Perception of Human Eye
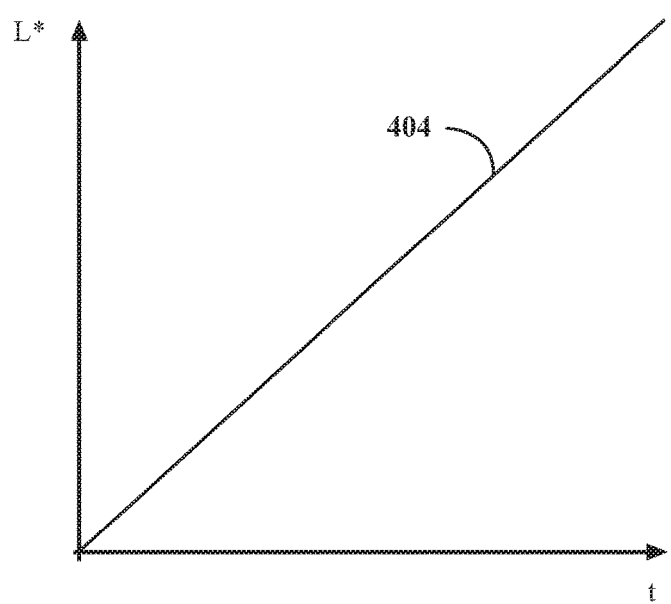

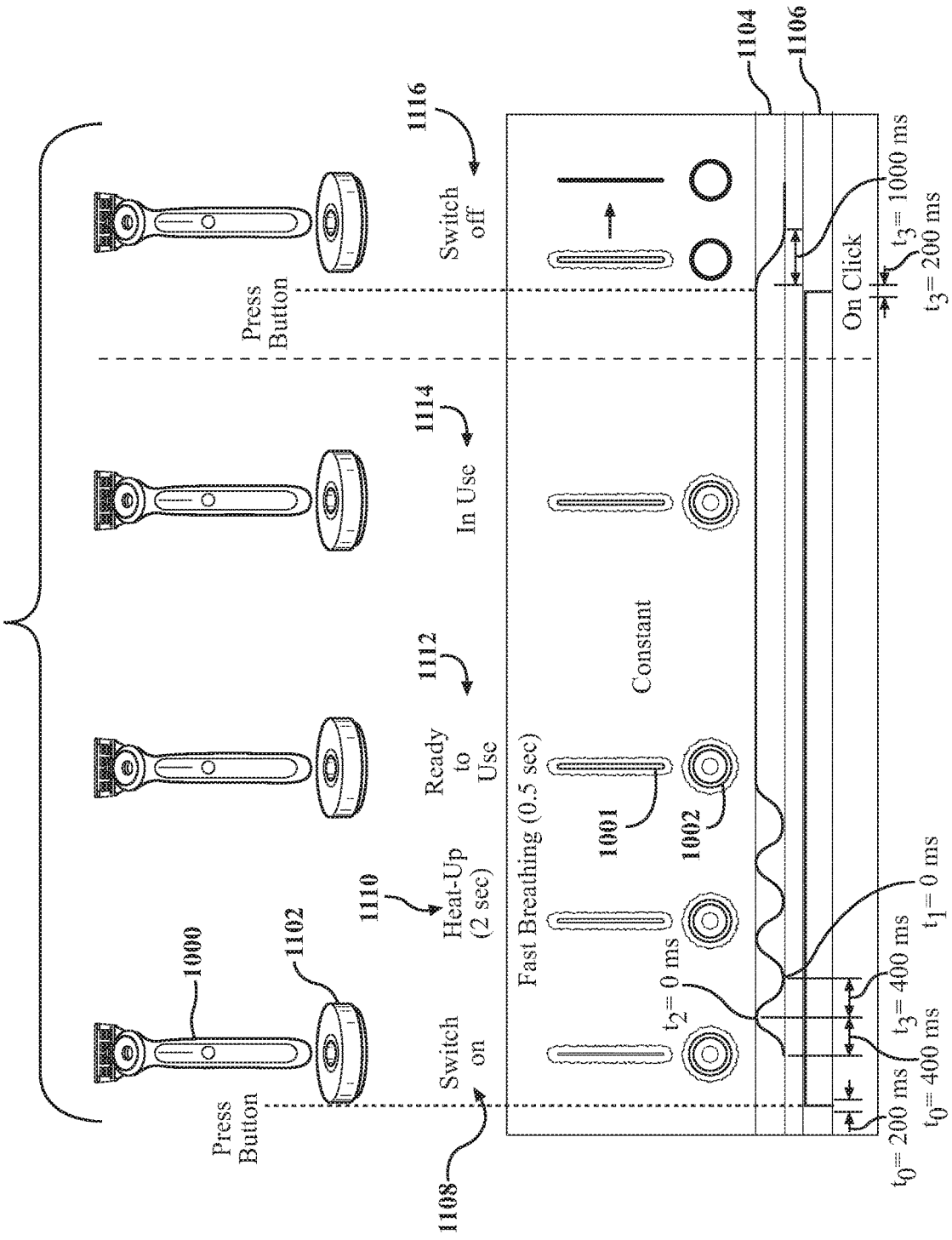

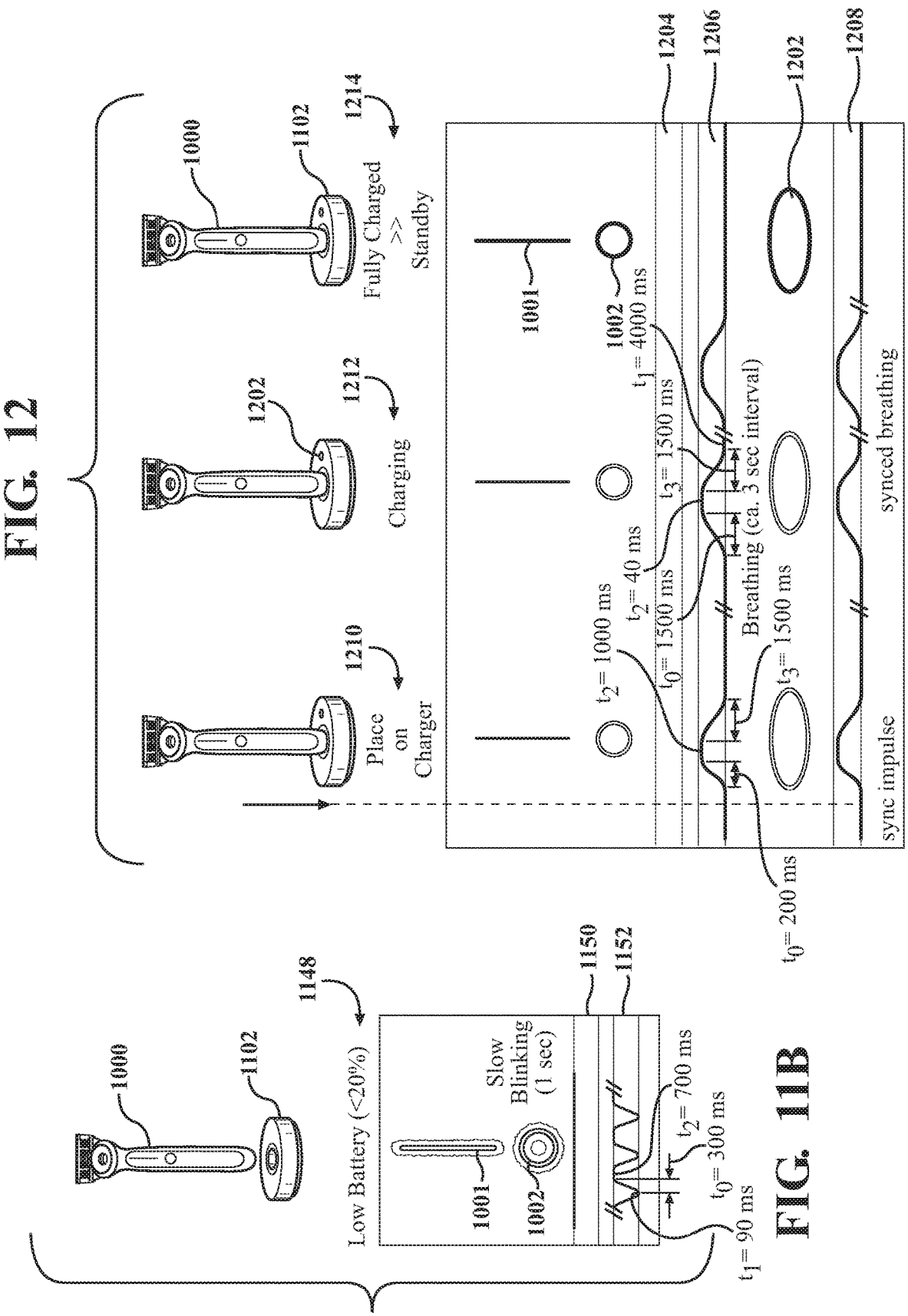

MODULATING AN ILLUMINATION LEVEL OF A USER INTERFACE LUMINOUS ELEMENT

FIELD OF THE INVENTION

The present disclosure relates generally to an electrical device user interface, and, more particularly, to such a user interface comprising a luminous element such as a light emitting diode (LED).

BACKGROUND OF THE INVENTION

Luminous elements of a user interface of an electrical device can be used to communicate one or more aspects about an operational status of the device to the consumer. In other words, an illumination level of a luminous element is indicative of an operational status of the electrical device. In the case of LEDs, one typical method for adjusting an illumination level of the LED is to switch the LED on or off or by blinking of the LED. For some consumers, such an abrupt change of the illumination level of the luminous element can be uncomfortable.

SUMMARY OF THE INVENTION

One aspect of the present invention relates to a system for controlling an illumination level of a luminous element of a user interface for an electrical device that includes a processor and a memory in communication with the processor for storing instructions that when executed by the processor cause the system to: store information defining a signal corresponding to a desired time-varying illumination level of the luminous element to be perceived by a human observer, wherein the corresponding signal comprises an increasing sinusoidal-based ramp function and a decreasing sinusoidal-based ramp function. The stored instructions when executed by the processor also cause the system to calculate a time-varying control signal based on the corresponding signal and a nonlinear sensitivity relationship between an actual illumination level and a resulting illumination level perceived by a human eye; and cause the luminous element to be illuminated in accordance with the calculated time-varying control signal.

Another aspect of the present disclosure relates to a method for controlling an illumination level of a luminous element of a user interface for an electrical device. The method includes storing, by a processor, information defining a signal corresponding to a desired time-varying illumination level of the luminous element to be perceived by a human observer, wherein the corresponding signal comprises an increasing sinusoidal-based ramp function and a decreasing sinusoidal-based ramp function. The method also includes calculating, by the processor, a time-varying control signal based on the corresponding signal and a nonlinear sensitivity relationship between an actual illumination level and a resulting illumination level perceived by a human eye; and causing, by the processor, the luminous element to be illuminated in accordance with the calculated time-varying control signal.

A further aspect of the present disclosure relates to a method for controlling an illumination level of a luminous element of a user interface for an electrical device. The method includes storing, by a processor, a pulse-width-modulated (PWM) control signal that is calculated based on stored information defining a signal corresponding to a desired time-varying illumination level of the luminous element to be perceived by a human observer and a nonlinear sensitivity relationship between an actual illumination level and a resulting illumination level perceived by a human eye, wherein the corresponding signal comprises an increasing sinusoidal-based ramp function and a decreasing sinusoidal-based ramp function. The method also includes driving, by the processor, the luminous element according to the stored control signal.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein:

FIG. 2A illustrates a PWM signal with a linearly increasing duty cycle in accordance with principles of the present disclosure;

FIG. 2B illustrates how brightness of a luminous element controlled with the PWM signal of FIG. 2A is perceived in accordance with principles of the present disclosure;

FIG. 4A illustrates a calculated PWM signal, based on a linearly increasing ramp function and the nonlinear relationship of FIG. 3, in accordance with the principles of the present disclosure;

FIG. 4B and FIG. 4C illustrate a linearly increasing and decreasing ramp function, respectively, in accordance with the principles of the present disclosure;

FIG. 10A-FIG. 13 illustrate an electrical device incorporating luminous user interface elements in accordance with the principles of the present invention.

DETAILED DESCRIPTION OF THE INVENTION

As mentioned above with regards to luminous elements of a user interface of an electrical device, switching of an LED on and off making it to blink can be uncomfortable for some consumers. A more gradual change of the illumination level of the LED is believed to be more pleasant for some consumers. Embodiments in accordance with the principles of the present disclosure contemplate modulating an LED's illumination level in a way that is perceived to be substantially sinusoidal by the human eye. As described more fully below, embodiments can include using a combination of a human-eye-compensation-formula with a harmonic-natural-sine-function.

Although one or more example electrical devices are discussed below, they are provided by way of example only to assist with understanding the principles of the present disclosure and are not intended to limit the interpretation or scope of the appended claims. Embodiments in accordance with the principles of the present disclosure include a wide variety of luminous elements such as, for example, LEDs, organic LEDs (OLEDs), and illuminated surfaces. Modulating an illumination level of a luminous element can include turning the element on, increasing the illumination level, maintaining the illumination level, decreasing the illumination level, and turning the element off. As explained below in more detail, the illumination level of the luminous element can be controlled using a PWM signal; however, one of ordinary skill will readily recognize that a signal with a varying voltage (discrete or analog) can be used to vary a luminous element's illumination level as well. Furthermore, a user interface of an electrical device can include more than one luminous element, each conveying information about a respective status of different operational characteristics of the electrical device.

Figure 1:
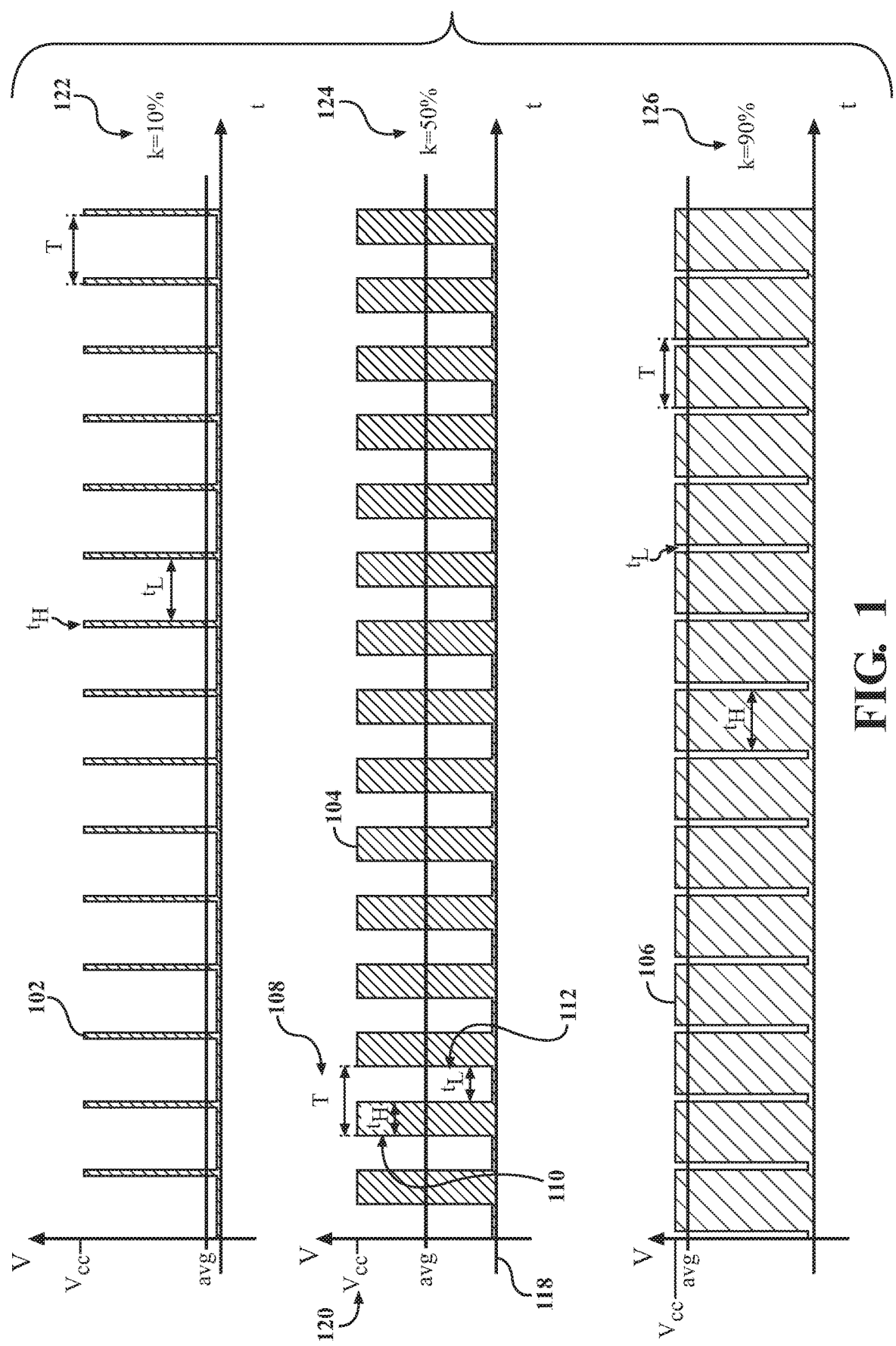
FIG. 1 illustrates three example Pulse-Width-Modulation (PWM) control signals for luminous elements in accordance with the principles of the present disclosure.

As mentioned above, to control the illumination level of an LED, the LED can be driven by a pulse-width-modulation (PWM) signal such as, for example, one produced by a microcontroller or similar device. FIG. 1 illustrates three different PWM signals 102, 104, 106. Each signal is periodic having a period 108 of T. In each period, there is a portion 110, $t_H$, in which the signal has a voltage level 120 of $V_{CC}$ and a portion 112, $t_L$, in which the signal has a voltage level 118 of about 0 volts. The voltage level $V_{CC}$ is sufficient to be above the forward voltage of the LED but low enough to limit a current through the LED so as to prevent damage to the LED. The quotient of $t_H/T$ defines a duty cycle of a PWM signal. The duty cycle "k" of the PWM corresponds linearly to the illumination level of the LED and can be expressed as a fraction between 0 and 1 or as an equivalent percentage between 0% and 100%. Thus, the signal 102 has a 'k' 122 equal to 10% and the illumination level of the LED driven by the signal 102 would be 10% of the illumination level if that LED was driven by a continuous, or DC, signal of $V_{CC}$. The signal 104 has a duty cycle k 124 of 50% and the signal 106 has a duty cycle k 126 of 90%.

Usually, for PWM signals used to drive LEDs, the switching frequency is so high (i.e., the period T is so short) that a human eye does not perceive the individual oscillations of the illumination levels. The LED is perceived to be shining continuously with the desired illumination level. The minimum speed of an LED oscillating which can be seen by the human eye varies from person to person. However, a minimum switching frequency of 50 Hz, or 50 times per second, can be typical.

FIG. 2A depicts a graph of a line 202 of how a duty cycle of a PWM signal is varied over time. In particular, the depicted duty cycle is increased in a linear manner from 0 to 1 or from 0% to 100%. Based on the above discussion, the illumination level of an LED driven by that PWM signal should also increase in a linear manner with the same slope as the line 202. FIG. 2B, however, depicts how the human eye perceives the increasing illumination level of an LED driven by a PWM signal having the changing duty cycles of FIG. 2A. The curve 204 indicates the subjective brightness perception of the human eye, which curve 204 does not match the line 202. Thus, a varying user interface with a linearly changing PWM signal is not perceived by the human eye as intended in a linearly changing manner, but, instead, the human eye views the increasing illumination level of the LED as changing in a non-linear manner.

Figure 3:
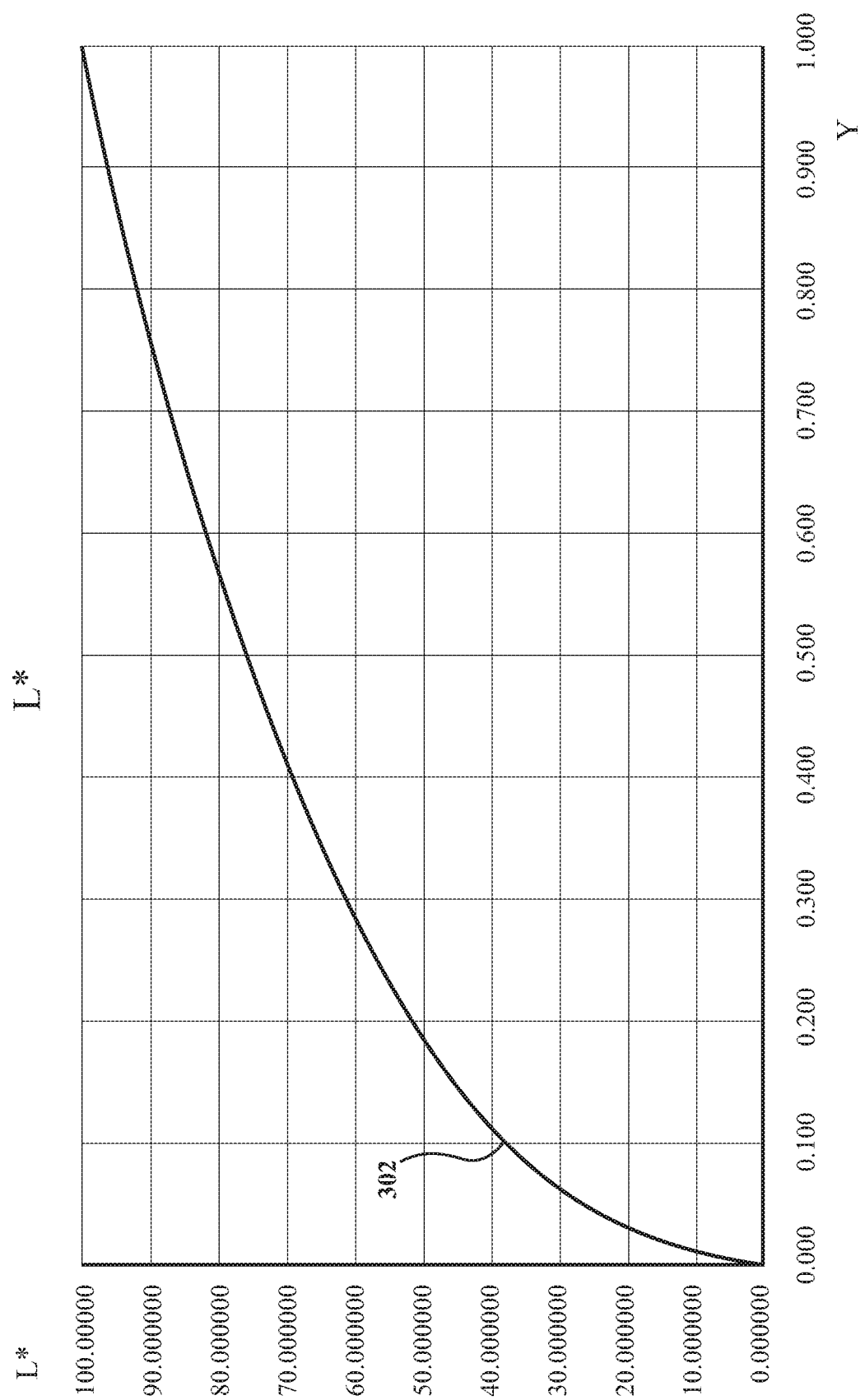
FIG. 3 illustrates a nonlinear relationship between luminance and psychometric lightness in accordance with the principles of the present disclosure.

Luminance of an object is its absolute intensity. Brightness is the object's perceived luminance, which depends on the luminance of the surrounding environment. Luminance and brightness can be different because human perception of an illumination level is sensitive to luminance contrast rather than absolute luminance. Thus, brightness is an attribute of visual perception in which a source appears to be radiating or reflecting light. Brightness is the perception elicited by the luminance of a visual target and can be referred to as psychometric lightness in the description that follows. Embodiments in accordance with the principles of the present invention account for the subjective perception of the human eye by relying on a compensation function based on research by CIE (International Commission on Illumination) that relates luminance to psychometric lightness. The compensation function is used to adapt the controlled illumination level of the luminous element, e.g., LED, to the nonlinear sensitivity of a human eye. The CIE research relates a luminance value, Y, that varies from 0 to 1 to a psychometric lightness value, L*, that varies from 0 to 100 and is depicted by the graph 302 of FIG. 3. The graph of FIG. 3 is calculated according to the following formula:

$$L^* = 903.3 \cdot Y \qquad \text{if } \boxed{Y \leq 0.008856}$$

$$L^* = 116 \cdot \sqrt[3]{Y} - 16 \quad \text{if } \boxed{Y > 0.008856}$$

In the above equation and the equations that follow, Y varies from 0 to 1 for a particular luminous element, with the value of "1" corresponding to an illumination level of that particular luminous element being driven, for example, by a PWM control signal with a duty cycle of 100%. In accordance with the principles of the present disclosure, a compensation function is defined as the inverse of the above formula that transforms, or converts, L* values into Y values and is defined as:

$$Y = \frac{L^*}{903.3} \qquad \text{if } \boxed{L^* \leq 8}$$

$$Y = \left(\frac{L^* + 16}{116}\right)^3 \quad \text{if } \boxed{L^* > 8}$$

Figure 4C:
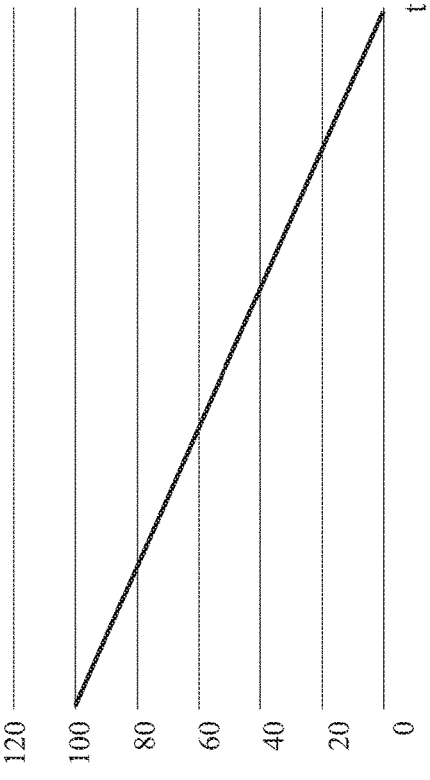

In operation, L* values can be defined so that the illumination level of the LED is perceived by the human eye in a desired way. Based on these L* values, the PWM or other type of signal for controlling the illumination level of the LED can be determined. FIGS. 4A and 4B illustrate one such example. In this example, the value of L*=100 corresponds to a Y value equal to "1" which also corresponds to a duty cycle of 100%. Also the value of L*=0 corresponds to a Y value equal to 0 which also corresponds to a duty cycle of 0%. In FIG. 4B, the psychometric lightness, or subjective brightness perception of the human eye, L* is defined by the graph 404 as increasing linearly over time. Using the above compensation function, the varying duty cycle of a PWM or other type of signal controlling the illumination level of the LED can be calculated. For a given value L*(t) a corresponding value Y(t) can be calculated which has a value between 0 and 1, inclusive. The Y(t) value which varies between 0 and 1 is equivalent to a PWM duty cycle k(t) which also varies between 0 and 1 (i.e., between 0% and 100%). In FIG. 4A, the graph 402 corresponds to the compensation function being applied to the graph 404 of FIG. 4B (i.e., the psychometric lightness values L* of the graph 404 in FIG. 4B are converted into luminance values Y using the compensation function above) and, thus, depicts how the duty cycle of a PWM signal, for example, can be controlled to achieve the perceived linear change in brightness depicted in FIG. 4B. FIG. 4C also depicts a perceived linear change in brightness but in FIG. 4C, the L* values decrease from 100 to 0 as time progresses.

Figure 5:
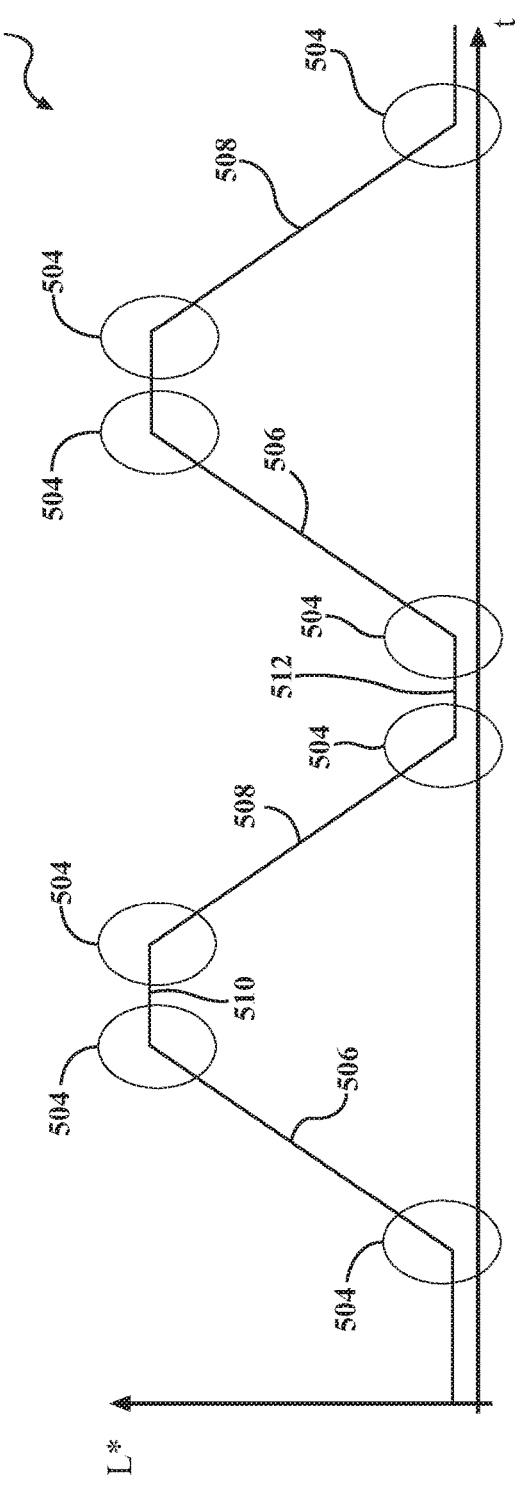
FIG. 5 illustrates a subjective brightness perception graph of a breathing luminous user interface element in accordance with the principles of the present disclosure.

A "breathing" luminous user interface is one that periodically alternates between increasing in illumination level and decreasing in illumination level. Thus, the perceived brightness of the luminous element also periodically alternates between increasing in illumination level and decreasing. One example is depicted in FIG. 5. The graph 502 illustrates how the perceived brightness varies over time. Thus, the graph 502 defines a signal corresponding to a desired time-varying illumination level of the luminous element to be perceived by a human observer. The graph 502 also illustrates how there are sharp transition points 504 between different portions of the graph 502. The signal or graph 502 can be characterized as increasing ramp functions 506 (as shown in FIG. 4B) and decreasing ramp functions 508 (as shown in FIG. 4C) that are non-continuous because of the presence of high-level regions 510 and the low-level regions 512. Using the compensation function described above, a duty cycle for a PWM signal, for example, can be calculated to control an LED's illumination level to achieve the desired perceived brightness shown in FIG. 5. In accordance with the principles of the present disclosure, one further refinement of the signal or graph 502 can be to smooth the transition points 504.

Instead of L* varying from 0 to 100 according to the linear ramp of FIG. 4B, a sinusoidal-based ramp function can be defined such as, for example:

$$f(t) = \left[\sin\left(\frac{t}{t_0} * \frac{\pi}{2}\right)\right]^2 \text{ for } \frac{t}{t_0} = 0 \ldots 1$$

Figure 6A:
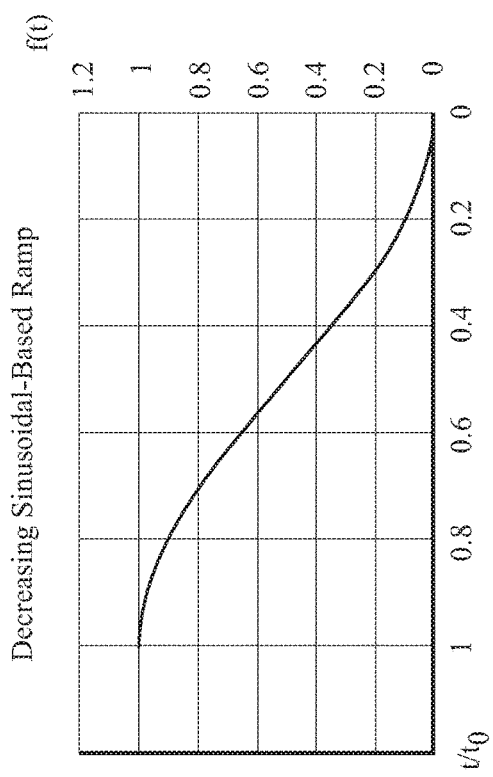
FIG. 6A and FIG. 6B illustrate a sinusoidal-based increasing and decreasing ramp function, respectively, in accordance with the principles of the present disclosure.
Figure 6B:
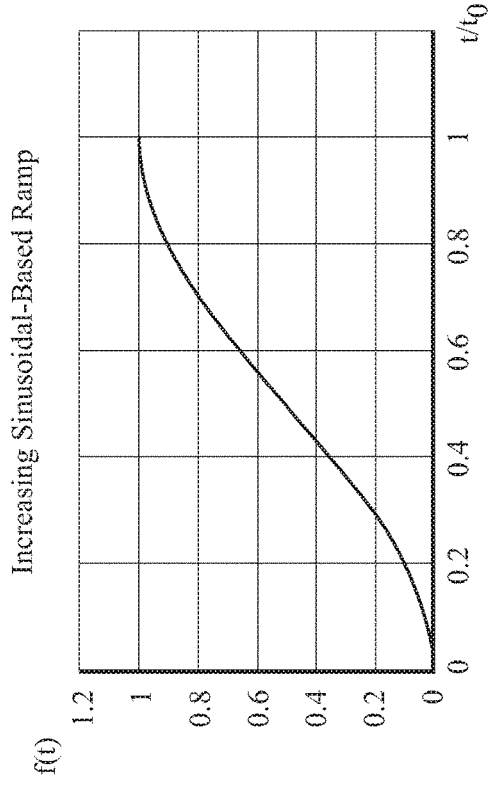
Figure 7A:
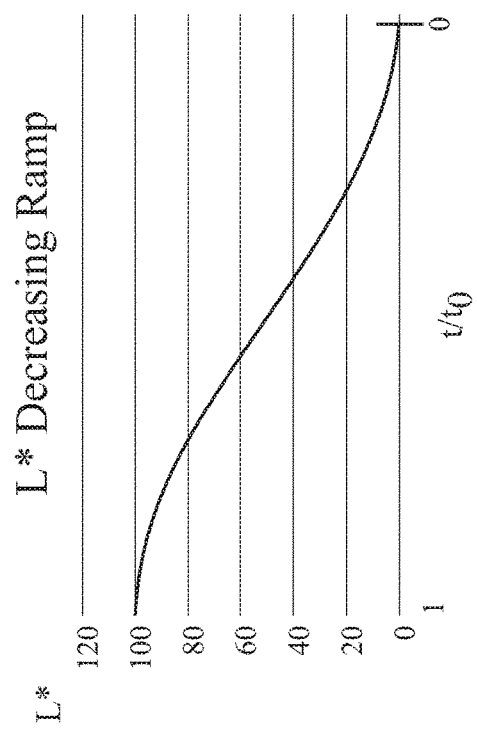
FIG. 7A and FIG. 7B illustrate a scaled version of the graphs of FIG. 6A and FIG. 6B, respectively, in accordance with the principles of the present disclosure.
Figure 7B:
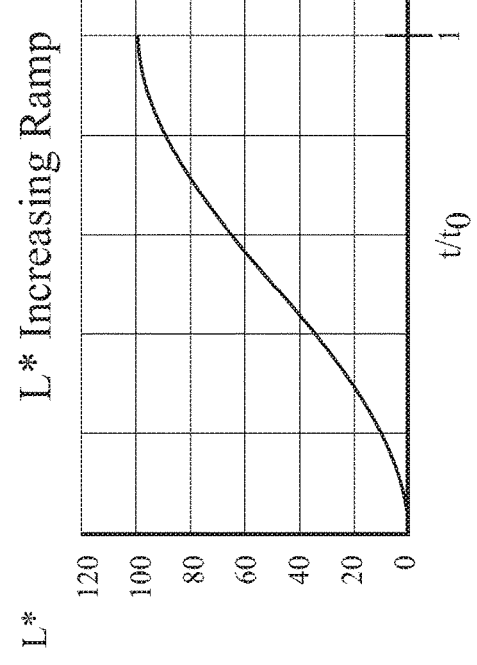

In the above equation, f(t) varies from 0 to 1 as $t/t_0$ increases from 0 to 1, as shown in FIG. 6A. Similarly, in the above equation, f(t) varies from 1 to 0 as $t/t_0$ decreases from 1 to 0, as shown in FIG. 6B. This sinusoidal-based ramp function can be used to derive an increasing sinusoidal-based ramp function for L* that varies from 0 to 100 and a decreasing sinusoidal-based ramp function that varies from 100 to 0. Assuming that a time period, to, is selected for the amount of time for the value of L* to increase from 0 to 100, then the increasing sinusoidal-based ramp function of FIG. 7A can be calculated according to L*(t)=[100*f(t)] for $0 \le t/t_0 \le 1$. Also, the decreasing sinusoidal-based ramp function of FIG. 7B can be calculated according to L*(t)=[100*f(t)] for $1 \ge t/t_0 \ge 0$. The graphs, or signals, of FIG. 7A and FIG. 7B correspond to how a designer plans for a time-varying illumination level of a luminous element to be perceived by a human observer. In other words, the information in the graphs of FIG. 7A and FIG. 7B define a respective signal corresponding to a desired time-varying illumination level of the luminous element to be perceived by a human observer. However, the control signal used to control the actual luminance, or illumination levels, of the luminous element will differ from the signals of FIG. 7A and FIG. 7B because of the above-noted nonlinear sensitivity relationship between an actual illumination level and the resulting illumination level as perceived by a human eye, as illustrated in FIG. 3.

Figure 8A:
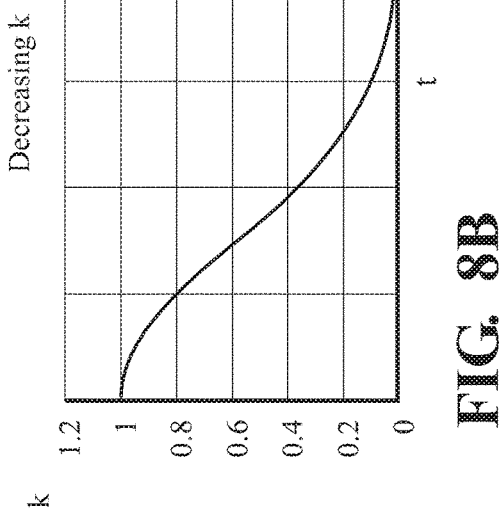
FIG. 8A illustrates a calculated PWM duty cycle signal, based on the sinusoidal-based increasing ramp function of FIG. 7A and the nonlinear relationship of FIG. 3, in accordance with the principles of the present disclosure.
Figure 8B:
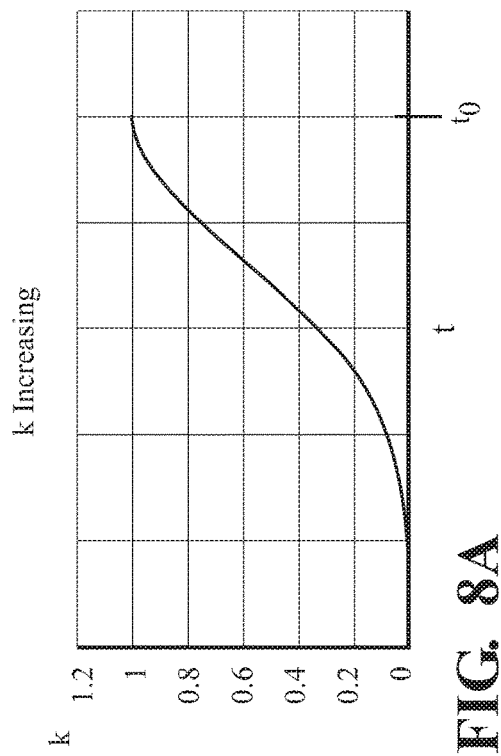
FIG. 8B illustrates a calculated PWM duty cycle signal, based on the sinusoidal-based increasing ramp function of FIG. 7B and the nonlinear relationship of FIG. 3, in accordance with the principles of the present disclosure.

As discussed above with respect to the linear ramps of FIG. 4B and FIG. 4C, the compensating function can be used to calculate an appropriate PWM signal, or other type of control signal, to control an illumination level of an LED to achieve a desired perception of the LED's brightness by a consumer. As also described above, the compensating function can be used to convert values of a signal that corresponds to a desired varying illumination level as it will be perceived by the human eye. The signal or graph resulting from this conversion corresponds to luminance values, Y, of how the illumination level of a luminous element will actually be controlled. Based on the resulting signal or graph of the luminance values, Y, a processor or microcontroller can generate a PWM control signal, for example, with a varying duty cycle to achieve the appropriate, actual illumination levels of the luminous element. FIGS. 8A and 8B depict duty cycle values that correspond to achieving the sinusoidal-based ramp functions of FIGS. 7A and 7B, respectively. For a given value L*(t), in FIG. 7A or FIG. 7B, a corresponding value Y(t) can be calculated using the compensation function set out above, such that the corresponding value Y(t) has a value between 0 and 1, inclusive. Thus the Y(t) value which varies between 0 and 1 is equivalent to a PWM duty cycle k(t) which also varies between 0 and 1 (i.e., between 0% and 100%).

Figure 9:
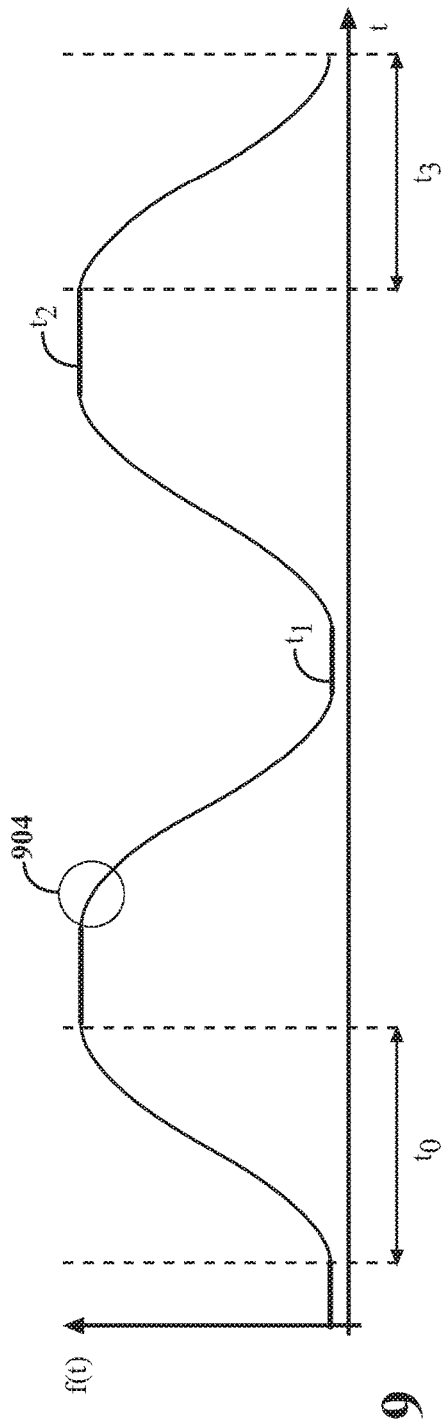
FIG. 9 illustrates a variation of the graph of FIG. 5 in accordance with the principles of the present disclosure.

FIG. 9 depicts the result of using the increasing and decreasing sinusoidal-based ramp functions in place of the linear ramp functions, in the graph of FIG. 5. As shown, the transition points 904 are smoother than the sharp transition points 504 from FIG. 5. Combining the above-described compensation function with the sinusoidal-based ramp functions allows an appropriate duty cycle for a PWM signal, or other control signal, to be calculated which will achieve the brightness of the LED to be perceived in the desired manner. The illumination level Y of the LED is still calculated according to:

$$Y(t) = k(t) = \frac{L^*(t)}{903.3} \quad \text{if } \boxed{L^*(t) \le 8}$$

$$Y(t) = k(t) = \left(\frac{L^*(t) + 16}{116}\right)^3 \quad \text{if } \boxed{L^*(t) > 8}$$

In the above equations, however, the values for L*(t) during the increasing or decreasing ramp portions of the graph, or signal, 902 are those of the sinusoidal-based ramp function discussed above in FIG. 7A and FIG. 7B where:

$$L^*(t) = 100 * \left[\sin\left(\frac{t}{t_0} * \frac{\pi}{2}\right)\right]^2 \text{ for } 0 \le t/t_0 \le 1.$$

In the graph 902 of FIG. 9, there is a time period $t_1$ that corresponds to a period in which the duty cycle of a corresponding PWM signal will remain equal to about "zero" such that the LED is perceived to be off. During time period $t_1$, $L*(t)=0$. As an example, the time period $t_1$ can vary between 0 seconds to hundreds of milliseconds. There is also a time period $t_2$ that corresponds to a time period in which the corresponding PWM signal will remain equal to about 100% such that the LED is perceived to be fully illuminated. During time period $t_2$, $L*(t)=100$. As an example, the time period $t_2$ can vary from 0 seconds to hundreds of milliseconds. Furthermore, the values of $t_1$ and $t_2$ can be different or they can be the same. In the graph 902 there is also a time period $t_0$ that corresponds to a time period in which the corresponding PWM signal will transition from the off state to the fully illuminated state. In the graph 902 there is also a time period $t_3$ that corresponds to a time period in which the corresponding PWM signal will transition from the fully illuminated state to the off state. The time periods $t_0$ and $t_3$ can be equal to one another or could be different. The values for $t_1$ and $t_2$ can also be configured as relative time periods such as, for example $t_1$ (or $t_2$) is $(0.8*t_0)$.

As some examples, the signal 902 can have $t_0$ equal 200 ms, $t_1$ equal 0 ms, $t_2$ equal 1000 ms, and $t_3$ equal 1500 ms, see FIG. 12. As another example waveform 902, $t_0$ and $t_3$ can equal 1500 ms, $t_2$ can equal 40 ms, and $t_1$ can equal 4000 ms, see FIG. 12. In another example, the waveform 902 can have $t_1$ and $t_2$ equal 0 ms and $t_0$ and $t_3$ can equal 400 ms, see FIG. 11A. Yet in a further example waveform 902, $t_0$ and $t_3$ can equal 300 ms, for example, $t_1$ can equal 90 ms, and $t_2$ can equal 700 ms, see FIG. 11B. In an example waveform 902 without an increasing sinusoidal based ramp, $t_2$ can be a relatively long period of time while $t_3$ can be equal to 300 ms, see FIG. 13.

A device that operates in accordance with the principles of the present disclosure can include a processor and a memory in communication with the processor that stores instructions that are executable by the processor. Furthermore, these instructions when executed by the processor cause the device to store information defining a signal corresponding to a desired time-varying illumination level of the luminous element to be perceived by a human observer, wherein the corresponding signal comprises an increasing sinusoidal-based ramp function and a decreasing sinusoidal-based ramp function. These instructions, when executed, also cause the device to calculate a time-varying control signal based on the corresponding signal and a nonlinear sensitivity relationship between an actual illumination level and a resulting illumination level perceived by a human eye and drive the luminous element to be illuminated in accordance with the calculated time-varying control signal. Alternatively, the time-varying control signal can be calculated by one or more systems separate from the device. This time-varying control signal, once calculated, can be stored in a memory of the device. As an example, the time-varying control signal can be stored as a look-up table that comprises time-ordered, discrete sampled values of the calculated time-varying control signal. The processor of the device can read values from the look-up table and then drive the illumination levels of the luminous element of the device in accordance with the time-varying control signal.

Figure 10A:
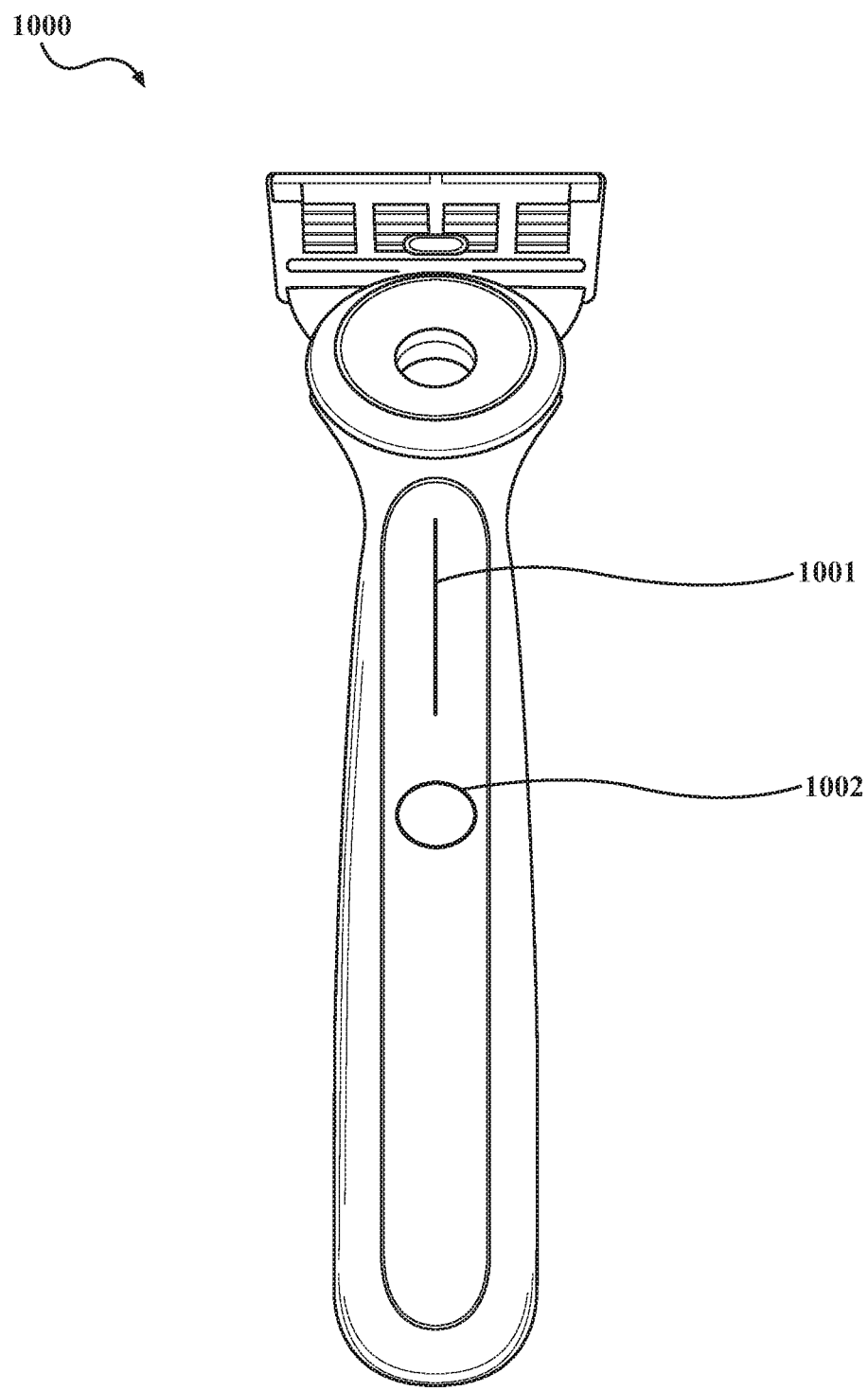

FIG. 10A illustrates an example electrical device that can include one or more luminous elements that operate in accordance with the principles of the present disclosure. The example razor 1000 of FIG. 10A can include a luminous heating indicator 1001 and a luminous power indicator 1002. In operation, the two indicators 1001, 1002 can operate individually or in synchronization with one another and can vary in color and illumination level to convey an operating status of the razor 1000 to a user.

Figure 10B:
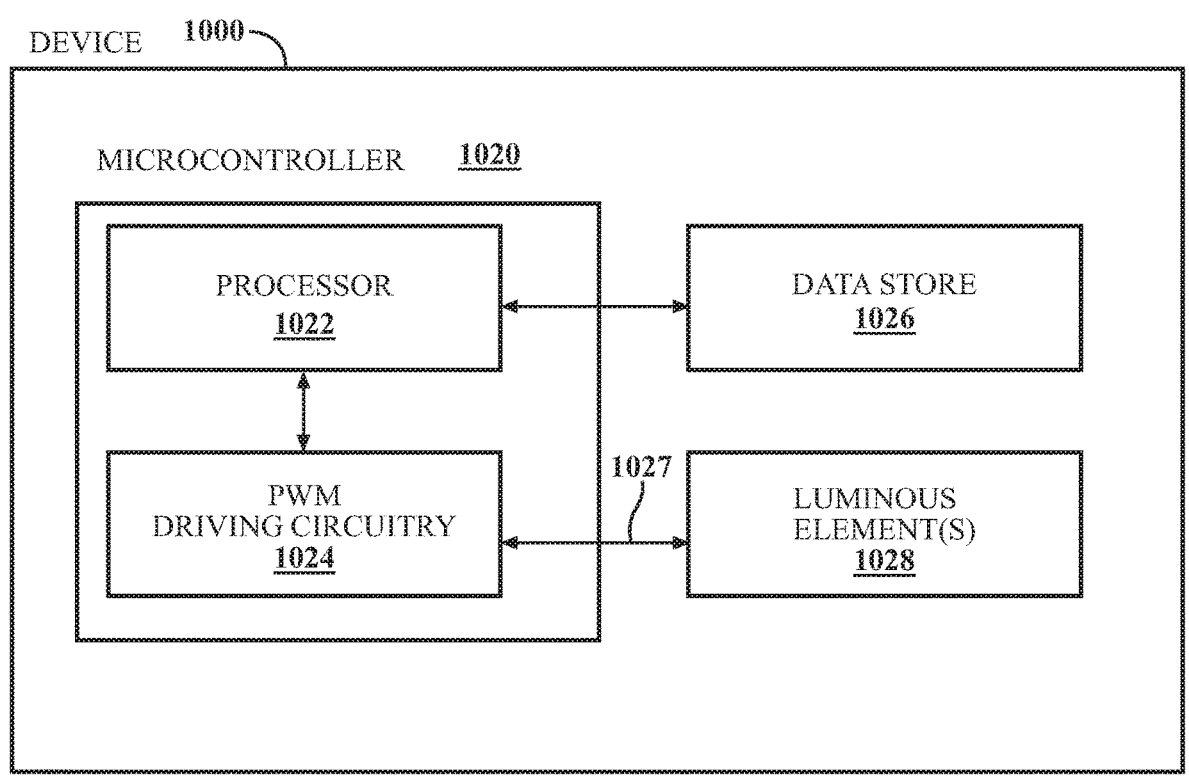

FIG. 10B is a block level diagram of functional elements of the razor 1000, or other device, that can control luminous elements of a user interface in accordance with the principles of the present disclosure. The other functional elements of the razor 1000 that do not relate to the luminous elements are omitted from FIG. 10B for the sake of clarity and brevity.

The razor 1000 can include a microcontroller 1020 or similar hardware that can retrieve data from a data store 1026, store data in the data store 1026, and retrieve executable instructions from the data store 1026. The microcontroller 1020 also includes a processor 1022 or similar circuitry that can execute executable instructions or initiate executable operations. In particular, the processor 1022 can communicate with a PWM driving circuitry 1024 to generate a PWM control signal 1027. The PWM control signal 1027 drives the luminous element(s) 1028 in such a way that the illumination level of the luminous element(s) 1028 varies according to the PWM control signal.

One of the executable operations the processor 1022 can initiate is storing information defining a signal corresponding to a desired time-varying illumination level of the luminous element to be perceived by a human observer. As described above, the signal or graph of FIG. 5 or FIG. 9 corresponds to a desired perceived illumination behavior for the luminous element 1028 that a designer of the device 1000 wants to achieve. The signal of FIG. 5 or FIG. 9 does not define the actual PWM signal, or other type of control signal, that is used to drive the luminous element 1028 but, rather, is representative of how the human eye will perceive the illumination of the luminous element 1028 when it is driven with an appropriate PWM control signal, or other type of control signal. The stored information that defines the signal corresponding to a desired time-varying illumination level of the luminous element to be perceived by a human observer can be configured in a variety of ways. For example, the information can be a mathematical function that describes the graph of FIG. 5 or FIG. 9, for example, and can be stored in and retrieved from the data store 1026. In this instance, the processor 1022 or a similar element can use the mathematical function to calculate values of the corresponding signal. Alternatively, the stored information can be a plurality of discrete samples corresponding to instantaneous values representative of the graph of FIG. 5 or FIG. 9, for example, and can be stored in and retrieved from the data store 1026 by the processor 1022. The stored information can be representative of a single period of a periodic signal and the sampled values can be time-ordered so that the processor 1022 can sequentially retrieve individual values of the stored information to determine values for the corresponding signal. The sampled values can represent the general contours of the graph or signal (e.g., that of FIG. 9) but can be scaled up or down by the processor 1022 if desired. In the particular embodiments described above, the corresponding signal comprises an increasing sinusoidal-based ramp function and a decreasing sinusoidal-based ramp function.

Another executable operation the processor can initiate is calculating a time-varying control signal based on a) the corresponding signal defined by the stored information and b) the nonlinear sensitivity relationship between an actual illumination level and a resulting illumination level perceived by a human eye. FIG. 3 illustrates one example of this type of nonlinear sensitivity relationship. The horizontal axis represents an actual or physical illumination level of a luminous element and the vertical axis represents how the human eye perceives the different illumination levels. In the examples described above, a compensating function is derived from the relationship illustrated in FIG. 3 and used to calculate the control signal. Because the corresponding signal defined by the stored information is time varying (an example is depicted by the graph of FIG. 5 or FIG. 9), the signal has multiple individual values that can be labeled L*(t) where "t" represents a discrete time value. The compensating function can be used to calculate luminance values Y(t) which correspond to the L*(t) values. These luminance values Y(t) can then be converted into corresponding duty cycle values k(t) for a PWM control signal or corresponding voltage values v(t) for a time-varying voltage control signal. The ordered series of values k(t), or v(t), define a calculated control signal which varies with time that can be used to drive the luminous element 1028.

Thus, another one of the executable operations the processor 1022 can initiate includes causing the luminous element to be illuminated in accordance with the calculated time-varying control signal such that the human observer perceives an illumination level of the luminous element 1028 generally corresponding to the corresponding signal. The processor 1022 may be configured to directly drive the luminous element 1028 or could be configured to control, or communicate with, separate PWM driving circuitry 1024 to produce a PWM signal having appropriate voltage levels and timing characteristics. The processor 1022 may also be configured to control, or communicate with, other driving circuitry (not shown) to produce a control signal (e.g., the varying voltage signal v(t) discussed above) having appropriate voltage levels and timing characteristics.

FIG. 11A illustrates an example of how the different luminous elements 1001 and 1002 may operate. The horizontal timeline 1104 provides an example graph of information defining a signal corresponding to a desired time-varying illumination level of the heating indicator 1001 to be perceived by a human observer and the horizontal timeline 1106 provides an example graph of information defining a signal corresponding to a desired time-varying illumination level of the power indicator 1002 to be perceived by a human observer. Once the razor 1000 is switched on (1108) a heat-up period 1110 can commence and can, for example, last about 2 seconds. During this time, the power indicator 1002 is fully illuminated and heating indicator 1001 breathes at a rate of about 0.5 second, for example. When the razor 1000 reaches a state where it is ready to use (1112) and while it is in use (1114), both luminous indicators 1001 and 1002 can remain continuously illuminated. When the razor 1000 is turned off, then both luminous indicators 1001 and 1002 can be turned off. In FIG. 11A, a charging stand 1102 is depicted with which the razor 1000 can be connected.

FIG. 11B illustrates how the luminous indicators 1001 and 1002 can be controlled to indicate a different operating status of the razor 1000. The horizontal timeline 1150 provides an example graph of information defining a signal corresponding to a desired time-varying illumination level of the heating indicator 1001 to be perceived by a human observer and the horizontal timeline 1152 provides an example graph of information defining a signal corresponding to a desired time-varying illumination level of the power indicator 1002 to be perceived by a human observer. During the condition that the battery state-of-charge is low (1148), the heating indicator 1001 is fully illuminated and power indicator 1001 blinks at a rate of about 1.0 second, for example.

FIG. 12 illustrates an example of how the luminous elements 1001 and 1002 may operate while the razor 1000 is connected with the charging stand 1102. In particular, the charging stand 1102 can include its own luminous element 1202 which can be a charging indicator. The horizontal timeline 1204 provides an example graph of information defining a signal corresponding to a desired time-varying illumination level of the heating indicator 1001 to be perceived by a human observer and the horizontal timeline 1206 provides an example graph of information defining a signal corresponding to a desired time-varying illumination level of the power indicator 1002 to be perceived by a human observer. The horizontal timeline 1208 provides an example graph of information defining a signal corresponding to a desired time-varying illumination level of the charging indicator 1202 to be perceived by a human observer.

In the example of FIG. 12, the heating indicator 1001 can remain un-illuminated during all of the periods shown such as when the razor 1000 is placed on the charger (1210), while the razor 1000 is charging (1212), and when the razor is fully charged (1214). In accordance with the principles of the present disclosure, a PWM or other type of control signal can be calculated that causes both the power indicator 1002 and the charging indicator 1202 to operate as a luminous breathing user interface. This PWM signal could, for example, cause the illumination level of both elements 1002 and 1202 to vary such that they are perceived to vary as shown in FIG. 9 and in the horizontal timelines 1206 and 1208. In the example of FIG. 12, the breathing rate is about 3 seconds. FIG. 12 also illustrates that when the razor 1000 is placed on the charging stand 1102, a sync pulse can be sent to a processor or controller that generates the PWM control signal for the power indicator 1002 and also sent to a processor or controller that generates the PWM control signal for the charging indicator 1202.

Figure 13:
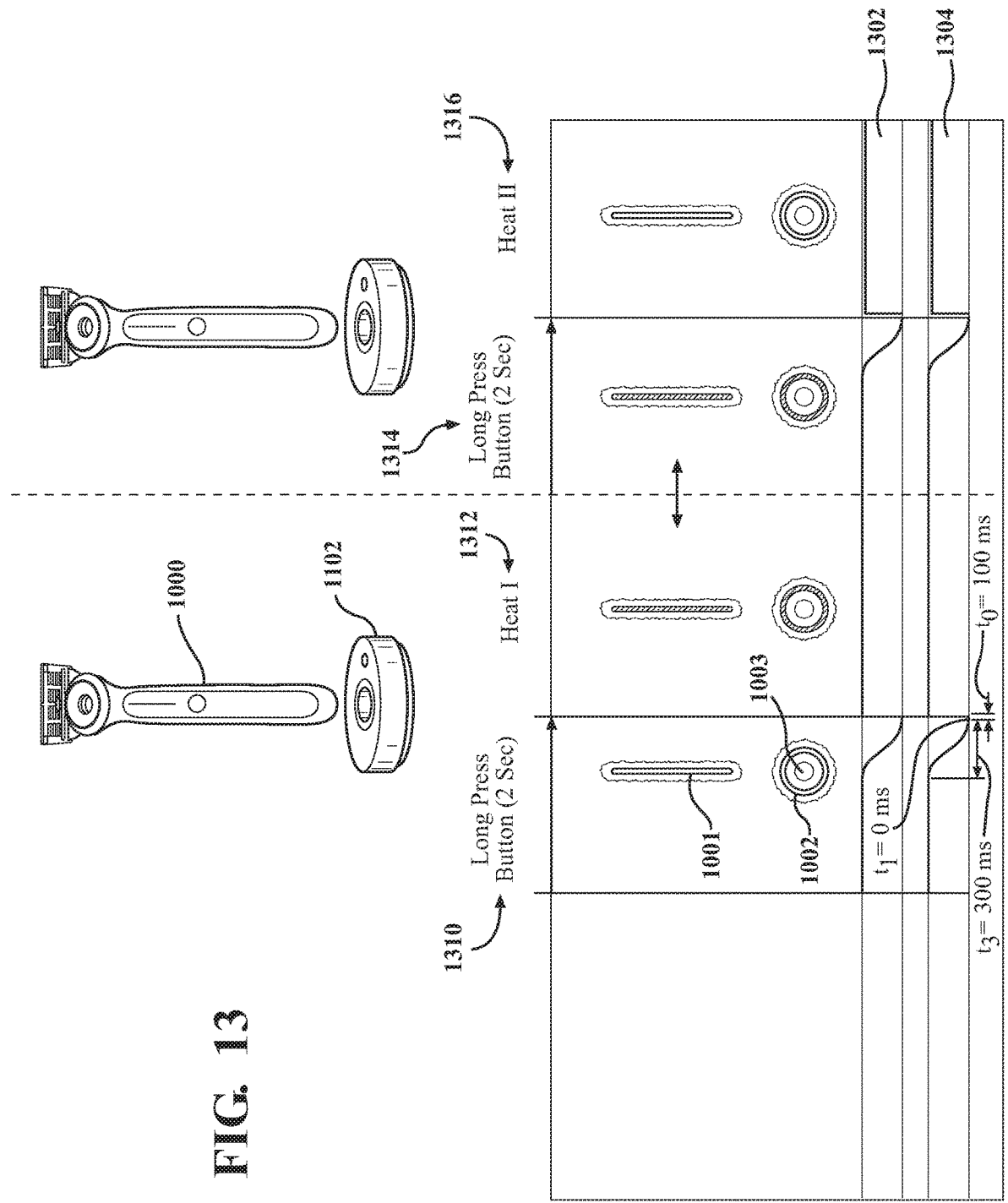

FIG. 13 illustrates that the same luminous element may, at different times, be different colors. In FIG. 13, the horizontal timeline 1302 provides an example graph of information defining a signal corresponding to a desired time-varying illumination level of the heating indicator 1001 to be perceived by a human observer and the horizontal timeline 1304 provides an example graph of information defining a signal corresponding to a desired time-varying illumination level of the power indicator 1002 to be perceived by a human observer. During a time when the user is depressing a button 1003 to enter a first heat mode (1310), both luminous indicators 1001 and 1002 may be fully illuminated and be red in color. During the first heat mode (1312) both indicators 1001 and 1002 may remain fully illuminated but be yellow in color. During a time when the user is depressing the button again (1314) to enter a second heat mode, both indicators 1001 and 1002 can remain fully illuminated and be yellow in color. However, when the second heat mode is reached (1316), the color of the illuminated luminous elements 1001 and 1002 may be changed to red.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer or device.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

Representative embodiments of the present disclosure described above can be described as follows:

A. A method for controlling an illumination level of a luminous element of a user interface for an electrical device, comprising:
  storing, by a processor, information defining a signal corresponding to a desired time-varying illumination level of the luminous element to be perceived by a human observer, wherein the corresponding signal comprises an increasing sinusoidal-based ramp function and a decreasing sinusoidal-based ramp function;
  calculating, by the processor, a time-varying control signal based on the corresponding signal and a nonlinear sensitivity relationship between an actual illumination level and a resulting illumination level perceived by a human eye; and
  causing, by the processor, the luminous element to be illuminated in accordance with the calculated time-varying control signal.

B. The method of paragraph A, wherein the corresponding signal is periodic and is comprised of multiple periods.

C. The method of paragraph A or B, wherein the corresponding signal comprises:
  a low-level value from which the increasing sinusoidal-based ramp function increases to a high-level value and the decreasing sinusoidal-based ramp function decreases from the high-level value to the low-level value.

D. The method of any of paragraphs A-C, wherein the nonlinear sensitivity relationship comprises a relationship between luminance and psychometric lightness.

E. The method of any of paragraphs A-D, wherein the calculated time-varying control signal is calculated by converting the corresponding signal using a compensating function, wherein the compensating function is based on the nonlinear sensitivity relationship between the actual illumination level and the resulting illumination level perceived by the human eye and comprises:

$$Y = \frac{L^*}{903.3} \quad \text{if } \boxed{L^* \leq 8}$$

$$Y = \left(\frac{L^* + 16}{116}\right)^3 \quad \text{if } \boxed{L^* > 8}$$

wherein
Y is the calculated time-varying control signal; and
L* is the corresponding signal.

F. The method of any of paragraphs A-E, wherein the increasing and decreasing ramp functions vary in time, t, in a manner proportional to:

$$f(t) = \left[\sin\left(\frac{t}{t_0} * \frac{\pi}{2}\right)\right]^2 \text{ for } \frac{t}{t_0} = 0 \ldots 1.$$

G. The method of any of paragraphs A-F, wherein the luminous element comprises one of a light emitting diode (LED) or a luminous surface.

H. The method of any of paragraphs A-G, wherein the stored information comprises a formula for calculating the corresponding signal.

I. The method of any of paragraphs A-H, wherein the stored information comprises a time-ordered plurality of discrete sampled values representative of the corresponding signal.

J. A system for controlling an illumination level of a luminous element of a user interface for an electrical device, comprising:
a processor; and
a memory in communication with the processor storing instructions that when executed by the processor cause the system to:
store information defining a signal corresponding to a desired time-varying illumination level of the luminous element to be perceived by a human observer, wherein the corresponding signal comprises an increasing sinusoidal-based ramp function and a decreasing sinusoidal-based ramp function;
calculate a time-varying control signal based on the corresponding signal and a nonlinear sensitivity relationship between an actual illumination level and a resulting illumination level perceived by a human eye; and
cause the luminous element to be illuminated in accordance with the calculated time-varying control signal.

K. The system of paragraph J, wherein the corresponding signal is periodic and is comprised of multiple periods.

L. The system of paragraph J or K, wherein the corresponding signal comprises:
a low-level value from which the increasing sinusoidal-based ramp function increases to a high-level value and the decreasing sinusoidal-based ramp function decreases from the high-level value to the low-level value.

M. The system of any of paragraphs J-L, wherein the nonlinear sensitivity relationship comprises a relationship between luminance and psychometric lightness.

N. The system of any of paragraphs J-M, wherein the calculated time-varying control signal is calculated by converting the corresponding signal using a compensating function, wherein the compensating function is based on the nonlinear sensitivity relationship between the actual illumination level and the resulting illumination level perceived by the human eye and comprises:

$$Y = \frac{L^*}{903.3} \quad \text{if } \boxed{L^* \leq 8}$$

-continued $$Y = \left(\frac{L^* + 16}{116}\right)^3 \quad \text{if } \boxed{L^* > 8}$$

wherein
Y is the calculated time-varying control signal; and
L* is the corresponding signal.

O. The system of any of paragraphs J-N, wherein the increasing and decreasing ramp functions vary in time, t, in a manner proportional to:

$$f(t) = \left[\sin\left(\frac{t}{t_0} * \frac{\pi}{2}\right)\right]^2 \text{ for } \frac{t}{t_0} = 0 \ldots 1.$$

P. The system of any of paragraphs J-O, wherein the luminous element comprises one of a light emitting diode (LED) or a luminous surface.

Q. The system of any of paragraphs J-P, wherein the stored information comprises a formula for calculating the corresponding signal.

R. The system of any of paragraphs J-Q, wherein the stored information comprises a time-ordered plurality of discrete sampled values representative of the corresponding signal.

S. A method for controlling an illumination level of a luminous element of a user interface for an electrical device, comprising:
storing, by a processor, a pulse-width-modulated (PWM) control signal that is calculated based on stored information defining a signal corresponding to a desired time-varying illumination level of the luminous element to be perceived by a human observer and a nonlinear sensitivity relationship between an actual illumination level and a resulting illumination level perceived by a human eye, wherein the corresponding signal comprises an increasing sinusoidal-based ramp function and a decreasing sinusoidal-based ramp function; and
driving, by the processor, the luminous element with the stored PWM control signal.

T. The method of paragraph S, wherein the stored PWM control signal comprises a look-up table.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for controlling an illumination level of a luminous element of a user interface for an electrical device, comprising:
   storing, by a processor, information defining a signal corresponding to a desired time-varying illumination level of the luminous element to be perceived by a human observer, wherein the corresponding signal comprises an increasing sinusoidal-based ramp function and a decreasing sinusoidal-based ramp function;
   calculating, by the processor, a time-varying control signal based on the corresponding signal and a nonlinear sensitivity relationship between an actual illumination level and a resulting illumination level perceived by a human eye; and
   causing, by the processor, the luminous element to be illuminated in accordance with the calculated time-varying control signal.

2. The method of claim 1, wherein the corresponding signal is periodic and is comprised of multiple periods.

3. The method of claim 1, wherein the corresponding signal comprises:
   a low-level value from which the increasing sinusoidal-based ramp function increases to a high-level value and the decreasing sinusoidal-based ramp function decreases from the high-level value to the low-level value.

4. The method of claim 1, wherein the nonlinear sensitivity relationship comprises a relationship between luminance and psychometric lightness.

5. The method of claim 1, wherein the calculated time-varying control signal is calculated by converting the corresponding signal using a compensating function, wherein the compensating function is based on the nonlinear sensitivity relationship between the actual illumination level and the resulting illumination level perceived by the human eye and comprises:

$$Y = \frac{L^*}{903.3} \quad \text{if } L^* \leq 8$$

$$Y = \left(\frac{L^* + 16}{116}\right)^3 \quad \text{if } L^* > 8$$

wherein
   Y is the calculated time-varying control signal; and
   L* is the corresponding signal.

6. The method of claim 1, wherein the increasing and decreasing ramp functions vary in time, t, in a manner proportional to:

$$f(t) = \left[\sin\left(\frac{t}{t_0} * \frac{\pi}{2}\right)\right]^2 \text{ for } \frac{t}{t_0} = 0 \ldots 1.$$

7. The method of claim 1, wherein the luminous element comprises one of a light emitting diode (LED) or a luminous surface.

8. The method of claim 1, wherein the stored information comprises a formula for calculating the corresponding signal.

9. The method of claim 1, wherein the stored information comprises a time-ordered plurality of discrete sampled values representative of the corresponding signal.

10. A system for controlling an illumination level of a luminous element of a user interface for an electrical device, comprising:
   a processor; and
   a memory in communication with the processor storing instructions that when executed by the processor cause the system to:
      store information defining a signal corresponding to a desired time-varying illumination level of the luminous element to be perceived by a human observer, wherein the corresponding signal comprises an increasing sinusoidal-based ramp function and a decreasing sinusoidal-based ramp function;
      calculate a time-varying control signal based on the corresponding signal and a nonlinear sensitivity relationship between an actual illumination level and a resulting illumination level perceived by a human eye; and
      cause the luminous element to be illuminated in accordance with the calculated time-varying control signal.

11. The system of claim 10, wherein the corresponding signal is periodic and is comprised of multiple periods.

12. The system of claim 10, wherein the corresponding signal comprises:
   a low-level value from which the increasing sinusoidal-based ramp function increases to a high-level value and the decreasing sinusoidal-based ramp function decreases from the high-level value to the low-level value.

13. The system of claim 10, wherein the nonlinear sensitivity relationship comprises a relationship between luminance and psychometric lightness.

14. The system of claim 10, wherein the calculated time-varying control signal is calculated by converting the corresponding signal using a compensating function, wherein the compensating function is based on the nonlinear sensitivity relationship between the actual illumination level and the resulting illumination level perceived by the human eye and comprises:

$$Y = \frac{L^*}{903.3} \quad \text{if } L^* \leq 8$$

$$Y = \left(\frac{L^* + 16}{116}\right)^3 \quad \text{if } L^* > 8$$

wherein
   Y is the calculated time-varying control signal; and
   L* is the corresponding signal.

15. The system of claim 10, wherein the increasing and decreasing ramp functions vary in time, t, in a manner proportional to:

$$f(t) = \left[\sin\left(\frac{t}{t_0} * \frac{\pi}{2}\right)\right]^2 \text{ for } \frac{t}{t_0} = 0 \ldots 1.$$

16. The system of claim 10, wherein the luminous element comprises one of a light emitting diode (LED) or a luminous surface.

17. The system of claim 10, wherein the stored information comprises a formula for calculating the corresponding signal.

18. The system of claim 10, wherein the stored information comprises a time-ordered plurality of discrete sampled values representative of the corresponding signal.

19. A method for controlling an illumination level of a luminous element of a user interface for an electrical device, comprising:

storing, by a processor, a pulse-width-modulated (PWM) control signal that is calculated based on stored information defining a signal corresponding to a desired time-varying illumination level of the luminous element to be perceived by a human observer and a nonlinear sensitivity relationship between an actual illumination level and a resulting illumination level perceived by a human eye, wherein the corresponding signal comprises an increasing sinusoidal-based ramp function and a decreasing sinusoidal-based ramp function; and driving, by the processor, the luminous element with the stored PWM control signal.

20. The method of claim 19, wherein the stored PWM control signal comprises a look-up table.

* * * * *